(12) United States Patent
Chow et al.

(10) Patent No.: US 7,756,910 B2
(45) Date of Patent: Jul. 13, 2010

(54) SYSTEMS AND METHODS FOR CACHE AND POOL INITIALIZATION ON DEMAND

(75) Inventors: Thorick Chow, El Cerrito, CA (US); Seth White, San Francisco, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 1049 days.

(21) Appl. No.: 10/967,674

(22) Filed: Oct. 15, 2004

(65) Prior Publication Data

US 2005/0262305 A1  Nov. 24, 2005

Related U.S. Application Data

(60) Provisional application No. 60/573,216, filed on May 21, 2004.

(51) Int. Cl.
*G06F 12/00* (2006.01)
*G06F 17/30* (2006.01)

(52) U.S. Cl. .................................. 707/813; 711/118
(58) Field of Classification Search ............. 707/103 Y; 711/118
See application file for complete search history.

(56) References Cited

U.S. PATENT DOCUMENTS

| | | | |
|---|---|---|---|
| 5,870,753 A | 2/1999 | Chang et al. | 707/103 R |
| 5,951,680 A | 9/1999 | Redlin et al. | 713/1 |
| 6,128,627 A * | 10/2000 | Mattis et al. | 707/202 |
| 6,353,844 B1 | 3/2002 | Bitar et al. | 718/102 |
| 6,418,447 B1 | 7/2002 | Frey et al. | 707/103 R |
| 6,502,103 B1 | 12/2002 | Frey et al. | 707/103 R |
| 6,505,210 B1 | 1/2003 | Frey et al. | 707/103 R |
| 6,560,501 B1 | 5/2003 | Walser et al. | |
| 6,560,609 B1 | 5/2003 | Frey et al. | 707/103 R |
| 6,651,140 B1 | 11/2003 | Kumar | 711/118 |
| 6,690,781 B2 | 2/2004 | Creamer et al. | 379/201.12 |
| 6,805,502 B2 | 10/2004 | Rai et al. | 400/61 |
| 6,944,680 B1 | 9/2005 | Lee et al. | 709/249 |
| 7,284,091 B2 | 10/2007 | Chow et al. | |
| 2002/0065809 A1 | 5/2002 | Kitayama | |
| 2003/0028682 A1 | 2/2003 | Sutherland | |
| 2003/0105837 A1* | 6/2003 | Kamen et al. | 709/220 |
| 2003/0120873 A1 | 6/2003 | Kanaley | |
| 2003/0177182 A1 | 9/2003 | Clark et al. | |
| 2004/0006549 A1 | 1/2004 | Mullins et al. | |
| 2004/0068537 A1 | 4/2004 | Freund et al. | |
| 2004/0088413 A1* | 5/2004 | Bhogi et al. | 709/226 |

(Continued)

*Primary Examiner*—Hosain T Alam
*Assistant Examiner*—Van H Oberly
(74) *Attorney, Agent, or Firm*—Fliesler Meyer LLP

(57) ABSTRACT

Users and processes are provided with various features to control the memory usage by a cache and pool dynamically at runtime. The cache and pool can be initialized on demand to remove idle objects of classes from them without the server being restarted. When the cache and pool reach their maximum sizes, idle objects in them may be removed to make room for newly active objects using various strategies in batches, where the schedule (periodicity), size and processing time of each batch can be dynamically adjusted. When a newly created object is being added to a full cache where each object is enrolled in a transaction, one or more active objects may be passivated from the cache based on various criteria to make room for the new instance to be added. Various features of the cache and pool can be defined in a configuration file.

19 Claims, 14 Drawing Sheets

U.S. PATENT DOCUMENTS

| | | | |
|---|---|---|---|
| 2004/0143823 A1* | 7/2004 | Wei | 717/140 |
| 2005/0050455 A1 | 3/2005 | Yee et al. | |
| 2005/0060498 A1* | 3/2005 | Curtis | 711/134 |
| 2006/0010171 A1 | 1/2006 | Lei | |
| 2006/0155819 A1 | 7/2006 | Grabinar et al. | |

* cited by examiner

```
<weblogic-ejb-jar>
 <weblogic-enterprise-bean>
  <!-- EmployeeBean uses its own dedicated, unshared cache,
       so idle-timeout-seconds is specified here for the entire cache
  -->
  <ejb-name> EmployeeBean </ejb-name>
  <entity-descriptor>
    <entity-cache>          401
      <concurrency-strategy> Exclusive </concurrency-strategy>
      ...
      <idle-timeout-seconds>6000</idle-timeout-seconds>
    </entity-cache>                                              402
...
```

Figure 4

```
<weblogic-application>
<!-- Here we declare the existence of an application level cache
     'MyEntityCache'.
     MyEntityCache may be shared by different entity bean types.
-->
<ejb>
  <entity-cache>                              501
    <entity-cache-name> MyEntityCache </entity-cache-name>
    <max-cache-size>
      <megabytes>50</megabytes>
    </max-cache-size>
  </entity-cache>
```

Figure 5 (a)

```xml
<weblogic-ejb-jar>
 <weblogic-enterprise-bean>
   <ejb-name> AccountBean </ejb-name>

<entity-descriptor>
    <!-- Here is where we associate AccountBean with the application level cache
     'MyEntityCache' that was declared in the application scoped 'weblogic-application.xml'
      descriptor. AccountBean may be sharing MyEntityCache with other entity beans.
      The value of idle-timeout-seconds that we specify here applies only to AccountBeans
      in MyEntityCache.
    -->
    <entity-cache-ref>                                              502
      <entity-cache-name> MyEntityCache </entity-cache-name>
      ...
      <idle-timeout-seconds>2000</idle-timeout-seconds>             503
    </entity-cach-ref>
    ..
  <weblogic-enterprise-bean>

<weblogic-enterprise-bean>
  <ejb-name> OrderBean </ejb-name>

<entity-descriptor>
   <!-- Here we associate OrderBean with the application level cache
      'MyEntityCache' that we also share with the AccountBean above.
      The value of idle-timeout-seconds that we specify here for OrderBean
      is different than the value that we set for the AccountBean.
   -->
   <entity-cache-ref>                                               504
     <entity-cache-name> MyEntityCache </entity-cache-name>
     ...
     <idle-timeout-seconds>1000</idle-timeout-seconds>              505
   </entity-cach-ref>
   ..
  <weblogic-enterprise-bean>
```

Figure 5 (b)

```
<weblogic-ejb-jar>
  <weblogic-enterprise-bean>
    <!-- EmployeeBean pool will shed itself of beans that
         have been present for more than 10 minutes
         but the cleaning task will retain at least 100 beans
         after it's done
    -->
    <ejb-name> EmployeeBean </ejb-name>
    <entity-descriptor>
      <pool>                                              701
        <max-beans-in-free-pool> 1000 </max-beans-in-free-pool>
        <initial-beans-in-free-pool> 100 </ initial-beans-in-free-pool>
        <idle-timeout-seconds> 600 </idle-timeout-seconds>      702
      </pool>
```

Figure 7

SYSTEMS AND METHODS FOR CACHE AND POOL INITIALIZATION ON DEMAND

CLAIM OF PRIORITY

This application claims priority from the following applications, which are hereby incorporated by reference in their entireties:

U.S. Provisional Patent Application No. 60/573,216, entitled SYSTEMS AND METHODS FOR CACHE AND POOL INITIALIZATION ON DEMAND by Thorick Chow et al., filed May 21, 2004.

CROSS-REFERENCE TO RELATED APPLICATIONS

This application is related to the following co-pending applications which are each hereby incorporated by reference in their entirety:

U.S. application Ser. No. 10,966,766 entitled SYSTEM AND METHOD FOR DYNAMIC CONTROL OF CACHE AND POOL SIZES, Inventors: Thorick Chow, Seth White, filed concurrently.

U.S. 1 application Ser. No. 10,966,330 entitled SYSTEM AND METHOD FOR PASSIVATION OF ENITITY BEANS IN TRANSACTION, Inventors: Thorick Chow and Seth White, filed concurrently.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of caching and pooling of objects, particularly EJB instances.

BACKGROUND

A programmable class can be an application server-side software component that encapsulates the business logic of an application. Objects (instances) of the class are created and managed at runtime as part of an application server to provide enterprise applications with a high level of abstraction. A major mechanism for the efficient reuse of objects is the caches and/or pools that are limited system memories capable of maintaining the objects at various stages of readiness for business use. Usually, a cache can maintain objects at a higher level of readiness than a pool can: although all objects can be pooled, only those objects in a cache can be enrolled in a transaction.

A cache maintains objects that are in two different states, "active" or "idle (inactive)", distinguished by whether an object is currently enrolled in a transaction or not. An object is considered to be idle when it is not enrolled in a transaction, otherwise it is regarded as active. Objects that are involved in a transaction must be accessible via a cache. At any given time, any of these objects in the cache may hold uncommitted modifications, may be required to be available at commit time for data consistency checks, and may be waiting for future access and possible modification by an application. After a transaction commits, all the objects in the cache that were enrolled in the transaction remain in the cache but are eligible for replacement or re-enrollment in a new transaction.

The price for the gains in response time by the cache and pool is of course paid for by an increased usage of memory. A cache has a ceiling (limit) on its size (the number of objects it can maintain at any time). As the demands on the server providing business applications using objects can be periodic, the maximum allowed size of the cache must be large enough to satisfy the memory demands of peak system usage. A cache may start out empty at deployment time. As objects are enrolled in transactions to serve user requests, the cache grows monotonically to accommodate the increasing processing demands. While the cache may grow to meet increasing demands, it typically may not shrink in response to decreasing demand. Even in systems that are subject to cyclic demand, the memory taken by the cache is often not relinquished even if it is no longer needed after a period of peak demand. As a result, the idle objects that are kept in the cache during off-peak periods are needlessly holding on to the heap space they claimed to handle peak demand, causing an inefficient use of system memory resources. In addition, if the system workload increases to the point that when a newly enrolled object is to be added to the cache that is not large enough to hold all objects currently enrolled in transactions, a system failure may happen and whatever transaction that failed to add the object to the full cache would have to abort its work as a result.

Similarly, a pool starts off with a size equal to the value of the "initial-beans-in-free-pool" property of the pool specified in the configuration data of a class at deployment time. Over time, the size of the pool may grow up to a size that is limited by "max-beans-in-free-pool" property of the pool. As is the case for caches, the pool may automatically grow to meet increasing demands, but it often does not shrink automatically in response to decreasing demand. This is also an inefficient use of system memory resources.

BRIEF DESCRIPTION OF THE DRAWINGS

FIG. 4 is an exemplary XML schema file used by a deployment descriptor in a cache in accordance with one embodiment of the invention.

FIG. 5(a)-(b) is an exemplary XML schema file used by a deployment descriptor in a cache in accordance with one embodiment of the invention.

FIG. 7 is an exemplary XML schema file used by a deployment descriptor in a pool in accordance with one embodiment of the invention.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Systems and methods of the present invention provide users and processes with various features to control the memory usage by a cache and pool dynamically at runtime. The cache and pool can be initialized on demand to remove idle objects of classes from them without the server being restarted. When the cache and pool reach their maximum sizes, idle objects in them may be removed to make room for newly active objects using various strategies in batches, where the schedule (periodicity), size and processing time of each batch can be dynamically adjusted. When a newly created object is being added to a full cache where each object is enrolled in a transaction, one or more active objects may be passivated from the cache based on various criteria to make room for the new instance to be added. Various features of the cache and pool, which may include, but are not limited to, the size limits of the cache and pool, the idle time limits on each class in the cache and pool, and other suitable properties (data) can be defined in a configuration file.

In various embodiments of the present invention, a class can be defined in an object-oriented programming language, wherein the object-oriented programming (OOP) language can be, but is not limited to, Java®, C++, and other suitable OOP language, and the class can be, but is not limited to, a Java® bean, an interface, a module, an Enterprise Java® Bean (EJB) and other suitable concepts. By way of a non-limiting example, EJB cache and pool system maintaining instances of one or more types of EJBs is used to illustrate the present invention in the following discussion, wherein the configuration file can be a deployment descriptor.

Figure 1:
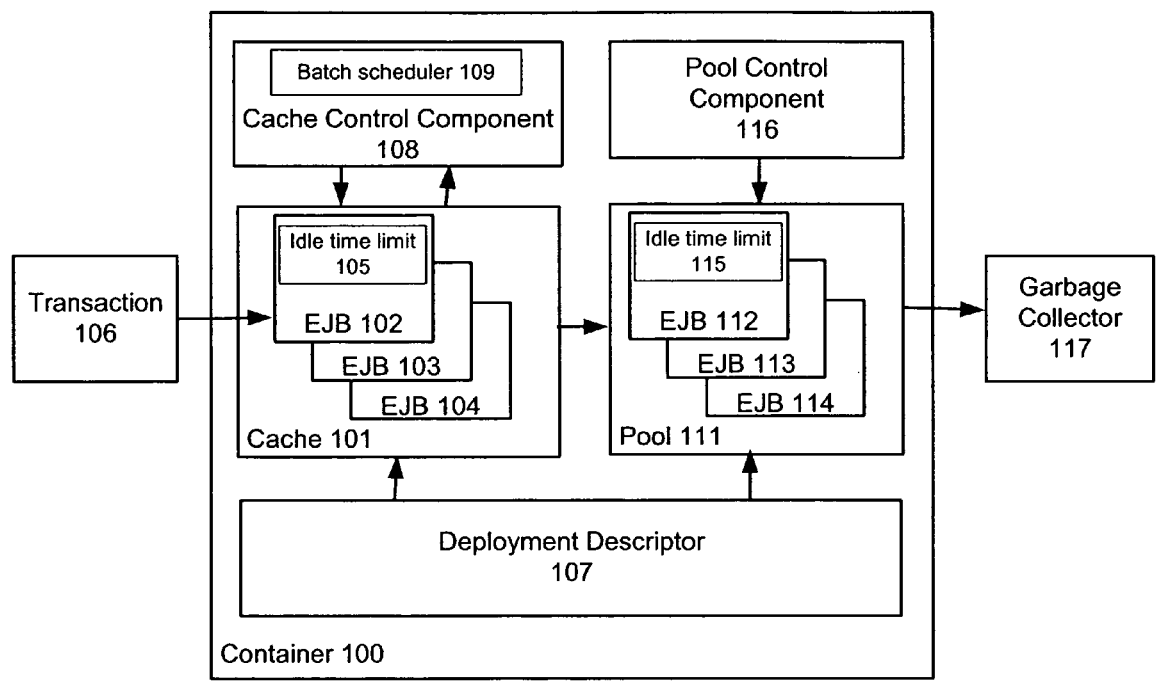
FIG. 1 is an illustration of an exemplary EJB cache and pool system in accordance with one embodiment of the present invention.

FIG. 1 is an illustration of an exemplary EJB cache and pool system in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, an EJB cache 101 in a container 100 stores in memory one or more instances 102, 103, 104, of one or more types (classes) of EJB. Each EJB instance in the cache has associated with it a limit 105 on its maximum idle time allowed. An EJB instance (102) can be either enrolled in a transaction 106 or idle (103, 104). Similarly, an EJB pool 111 stores EJB instances 112, 113, 114 which have been instantiated and loaded into memory but are currently idle and at a readiness level lower than those EJB instances in the cache. Each EJB instance in the pool also has associated with it a limit 115 on permitted idle time before it is eligible for removal. A deployment descriptor 107 defines various configuration properties of the cache. A cache control component 108 is capable of instantiating an EJB instance, storing it in the cache, monitoring its status in the cache, and removing and/or passivating it to the pool if necessary. In addition, the cache control component may contain a batch scheduler 109, which is capable of removing idled EJB instances in batches and setting the limit on processing time of each batch, which can be adjusted dynamically based on the feedback from the previous batch. Similarly, 116 is a pool control component capable of storing an EJB instance in the pool, monitoring its status in the pool, and removing it to the garbage collector 117 if necessary.

In some embodiments, an EJB cache and/or pool can be initialized on demand at runtime. This feature provides the user or a process with the ability to clean the caches and pools of idle EJB instances dynamically to free up unused memory held by an EJB cache and/or pool. It can be used to simulate the initial cache and pool conditions at the start of the deployment of an EJB, thus alleviating the requirement to un-deploy and/or re-deploy the related application and saving a lot of time that would otherwise be spent to shutdown and startup an application server.

Figure 2:
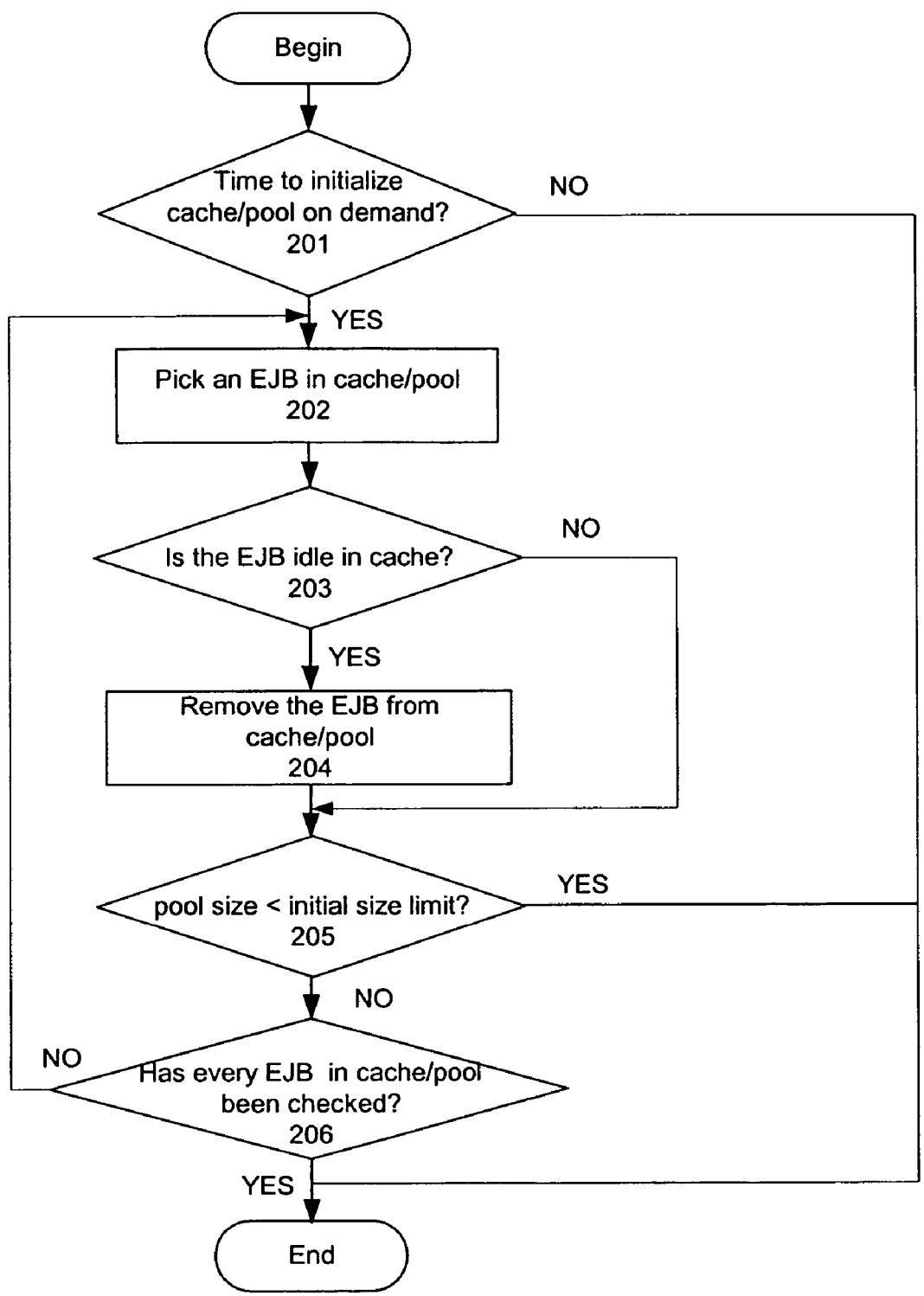
FIG. 2 is a flow chart illustrating an exemplary process of cache and pool initialization on demand in accordance with one embodiment of the present invention.

FIG. 2 is a flow chart illustrating the exemplary process of cache and pool initialization on demand in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, once a user or a process decides to perform cache and/or pool initialization at step 201, the cache and pool management component will pick an EJB instance in the cache and/or pool at step 202. If it is determined at step 203 that the EJB instance in cache is currently idle (EJB instances in a pool are always idle), it will be removed from the cache and/or pool at step 204. Steps 202-204 will be repeated until every EJB instance in the cache and/or pool has been checked at step 206. In the case of a pool, the initialization may stop at step 205 once the size of the pool is reduced to a pre-defined initial pool size limit.

In some embodiments, an on-demand initialization of an EJB cache can be performed, which removes all EJB instances that are not enrolled in a transaction at the moment when they are evaluated. If a bean instance is enrolled in a transaction at the time of evaluation, then that instance is busy and will not be removed. This means that after the cache cleaning process has completed, a quiescent system will have a cache which is completely empty, whereas an active system may have some EJB instances in its cache that have very recently been enrolled in transactions.

In some embodiments, an on-demand initialization of an EJB pool means the shrinking of the size of the pool down to its "initial-beans-in-free-pool" value set by the deployment descriptor. After the pool clearing process has completed, the pool will contain no more EJB instances than are specified by the pool property "initial-beans-in-free-pool".

In some embodiments, EJB instances that have been designated for removal from cache and/or pool can be relocated as follows:

Instances of entity beans in the cache may be relocated to the EJB pool;

EJB instances in the pool will be removed to a garbage collector where their memory space will be recycled.

In some embodiments, an EJB cache and/or pool may be either "dedicated" or at the "application-level". A dedicated cache is dedicated to caching instances of a specific type of EJB. An application-level cache is heterogeneous, shared by EJB instances of different types, e.g., it may contain instances of a mixture of AccountBeans and CustomerBeans. An application-level cache is optional and can be declared by the deployment descriptor.

In some embodiments, each type of EJB may have its own cache and/or pool containing instances of its own type only. For such dedicated cache and pool, the on-demand initialization process can be controlled via a single button exposed on a user interface (e.g., a console) associated with the EJB and trigger the initialization of its cache and/or pool. Alternatively, such on-demand initialization process can also be controlled by one or more processes.

In some embodiments, the initialization of an application-level cache can be performed. Initialization of an application-level cache applies to instances of all EJB types in the cache. Evaluation of a candidate EJB instance for removal from the cache can be the same as is outlined for a homogeneous cache described above. When the application level cache is initialized, the EJB pool containing instances of relevant types is also initialized. An application level cache may be explicitly initialized via a button on an application pane or a process as described above.

In some embodiments, the feature of dynamic control of EJB cache and pool sizes provides a way to specify how to have the cache and/or pool free up unused memory during periods of low demand by trimming in an automated fashion of aged cached and/or pooled EJB instances that have been idling over a certain period of time. A timeout mechanism can been put into place such that instances that have been idle for a period of time specified by the deployment descriptor of the EJB are removed from the cache and/or pool. Thus, the amount of memory taken up by the cache and/or pool during peak usage periods is released during off-peak usage periods and is available for use by other processes.

Figure 3:
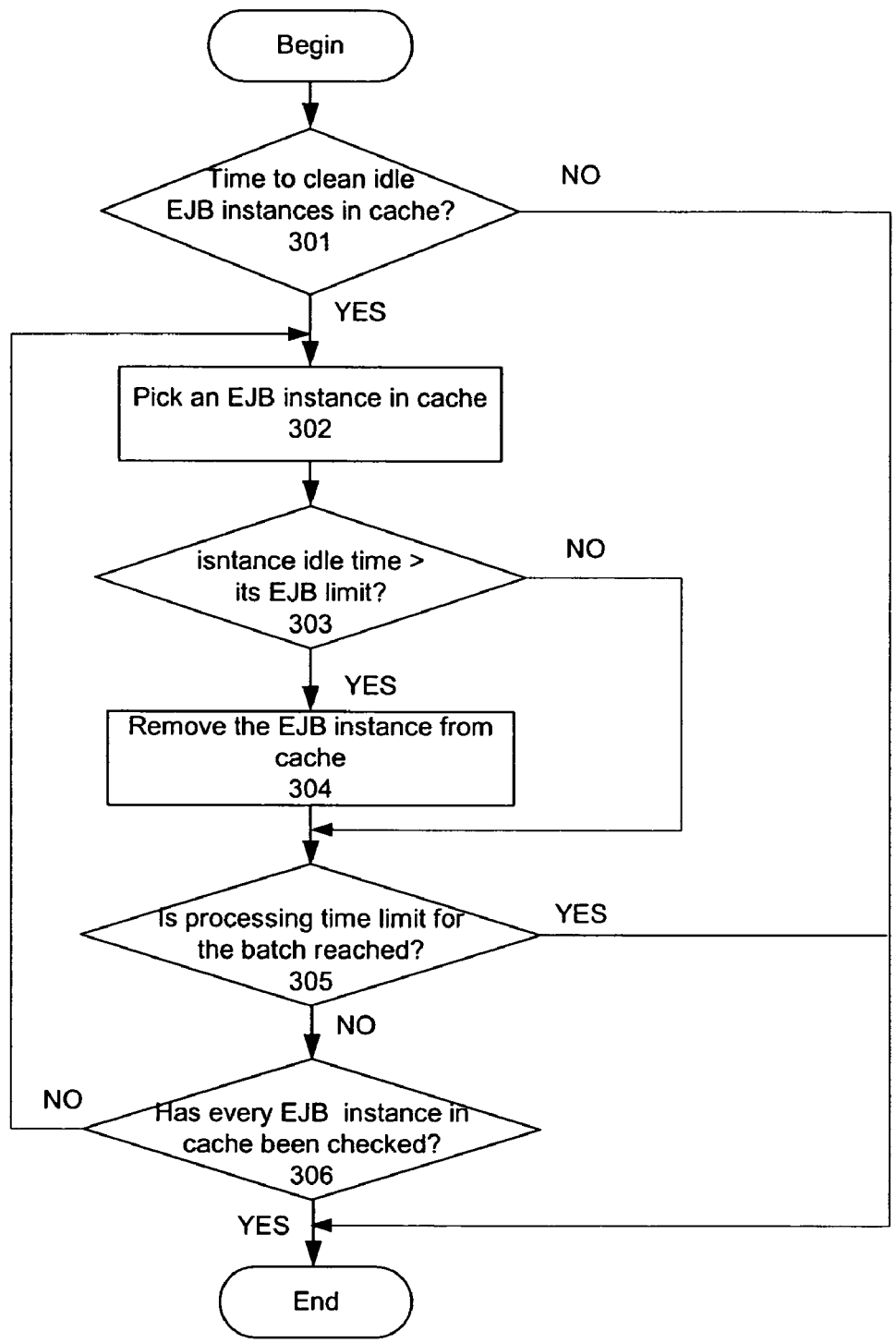
FIG. 3 is a flow chart illustrating an exemplary process of dynamic control of cache sizes in accordance with one embodiment of the invention.

FIG. 3 is a flow chart illustrating the exemplary process of dynamic control of cache sizes in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 3, if it is time to dynamically size a cache to clean up idle EJB instances in the cache and leave room for the newly added instance at step 301, an instance in the cache will be picked at step 302. Step 303 checks if the idle time of the EJB instance is greater than the specified "idle-timeout-seconds" of its type. If so, the EJB instance will be removed from the cache at step 304. Steps 302-304 are repeated for every EJB instance in the cache until either the limit on the processing time of a batch job has been reached at step 305 or every EJB instance in the cache has been checked at step 306.

In some embodiments, the size of an EJB cache, especially the off-peak memory usage of the cache, can be controlled dynamically by specifying how long the cache will allow an instance to remain idle before removing it from the cache. In aspects of these embodiments, the idle time of an EJB instance is a measurement of how long it has been since it last participated in a transaction. The cache will honor an integer-valued "idle-timeout-seconds" property specified for an EJB type by the deployment descriptor, which refers to the amount of idle time that an instance of the EJB type will be allowed to accumulate before being eligible for removal from the cache due to its inactivity. Idle-timeout-seconds will cause an instance to be eligible for removal from the cache if it has not been enrolled in a transaction for a period of "idle-timeout seconds" or longer. The cache management component can use a timer daemon to remove these time-expired instances from the cache, thus freeing up heap space for others to use. Such daemon can be run with either a fixed periodicity or a variable periodicity depending on conditions.

In some embodiments, the dynamic cache sizing process can be activated if EJB types of instances in the cache are assigned "idle-timeout-seconds" values greater than zero. If an EJB type of a cached instance has no "idle-timeout-seconds" property value specified or if that value is specified as "0", then the process of cleaning up idle EJB instances of that EJB type is not active and there will be no periodic removal of idle instances of that EJB type from the cache.

In some embodiments, the "idle-timeout-seconds" can be specified for an EJB cache at either the "dedicated" or the "application level". A dedicated cache is dedicated to caching instances of a specific EJB type and the "idle-timeout-seconds" feature is specified for the entire cache. An application-level cache may be shared by instances of different EJB types and each of the EJB types that share an application level cache may have its own distinct specification of an "idle-timeout-seconds" value specified in the deployment descriptor. The ability to specify different values of "idle-timeout-seconds" for different EJB types that share the cache is useful in cases where it makes sense to cache some EJB types longer than others. For example, if read-write and read-only beans are sharing an application level cache, it might make sense for the idle instances of read-only beans to remain in the cache for longer than the instances of read-write beans.

In some embodiments, the fixed periodicity of dynamic sizing process of a dedicated cache is equal to the value of "idle-timeout-seconds". For an application-level cache, the fixed periodicity of dynamic cache sizing can be equal to MIN (set of idle-timeout-seconds for all EJB types in the cache), since multiple types of EJB may share the cache each of which is allowed to have its own value of "idle-timeout-seconds".

In some embodiments, the periodicity of dynamic sizing process of a cache can be determined based on one or more of the following rules:

If the fixed periodicity of the process is greater than or equal to a certain time limit (e.g., 2 minutes), then the dynamic sizing process runs according to the fixed periodicity.

If the fixed periodicity is less than the time limit, then in order to conserve thread handling resources, the dynamic sizing process may set the variable periodicity according to the following algorithm:

```
kickoff_time = fixed_periodicity; // ms
while(true) {
    // cleaning process fires after kickoff_time has elapsed
        if (exists timed out beans) {
            do cleaning
            kickoff-time = fixed_periodicity; // set delay till next run
```

-continued

```
    }
    else if (kickoff_time < (1000ms * 60 s * 2)) {
        // increase the time till the next kickoff if
        // there was no work to do this time.
        kickoff_time += kickoff_time;
    }
}
```

In some embodiments, it is desirable to remove those EJB instances that have been idle for the longest period of time first. In order to be able to process idle instances in a "most idle first" order, a standard Least-Recently-Used (LRU) aging algorithm can be used in which all idle instances can be kept in a queue-like data structure and sorted (ordered) from the longest to the shortest based on their idle time, which is aged since the last time that they stop being actively enrolled in a transaction.

In some embodiments, the process of dynamic cache sizing requires that the cache be locked (denying access by other operations) while the process is taking place. Thus, while idle EJB instances are freed from the cache, all application work that requires access to the cache is blocked. This may be perceived by the system users as a degradation in service. The removal of idle instances from the cache while reducing the perception of a degradation in service can be accomplished by not removing all the idle instances at once. The removing process can be split into batches so that access and locking of the cache may alternate between the dynamic sizing task and the user's application tasks. This method may help to boost concurrency and fair access, e.g., the cache does not become unavailable to user programs for extended periods of time and the perceived amount of service degradation is reduced.

In some embodiments, a self-correcting batch scheduler with time-slice feedback mechanism can be deployed by the cache control component to set the size of a batch. By way of an illustration, the scheduler has a target (limit) for the amount of process time that it would like to see taken by each dynamic cache sizing batch. Giving a batch this process time limit, the scheduler measures how much time it will take to process that batch. Then the average time spent to process per EJB instance is computed and the size of the next batch (number of instances to be processed) is computed in order to meet the target on batch processing time. This approach thus adjusts for fluctuations in system usage by keeping the process time of each batch targeted towards a constant value without having to know anything about the nature of the overall system usage patterns. If the overall system becomes heavily loaded, the batch size will decrease as it will take longer on average to process each EJB instance. When the overall system becomes lightly loaded, the batch size is increased as it will take less time on average to process each EJB instance. The end result is that the users of the cache do not perceive a major outage due to the cache becoming completely unavailable while executing the dynamic cache sizing process.

In some embodiments, the deployment descriptor or other suitable configuration mechanism may set properties of an EJB cache for dynamic sizing using an XML schema instance file. The properties defined by the deployment descriptor depend upon which type of cache is in use.

For a dedicated cache containing instances of only a single EJB type, the clean-up process is controlled by the "idle-timeout-seconds" element 402 under the "entity-cache" tag 401, as shown in the exemplary code in FIG. 4. No other new elements need to be added to the deployment descriptor.

For an application level cache containing instances of different EJB types, the application level cache can be declared in the "entity-cache" element 501 in the deployment descriptor, as shown in the exemplary code in FIG. 5(a). EJB types that share an application level cache specify bean specific properties in the "entity-cache-ref" tags 502, 504 as shown in the exemplary code in FIG. 5(b). A new "idle-timeout-seconds" element 503, 505 will be added to each "entity-cache-ref" tag to enable each EJB type to specify its own "idle-timeout-seconds" property.

Similar to an EJB cache, an EJB pool serves as a reservoir for EJB instances that are kept in a stage of readiness for usage. To promote satisfactory response from EJB instances just after deployment time, a pool may be configured with an "initial-beans-in-free-pool" property that determines how many EJB instances will be preloaded into the pool at deployment time. As instances are needed at runtime, they are drawn from the pool or created and initialized. At the end of their business usage cycle, instances can be returned back to their pools from the cache for re-use. Similar to an EJB cache, the size of the pool may grow to meet increasing demands up to a size specified by its designated "max-beans-in-free-pool" property in a deployment descriptor.

Figure 6:
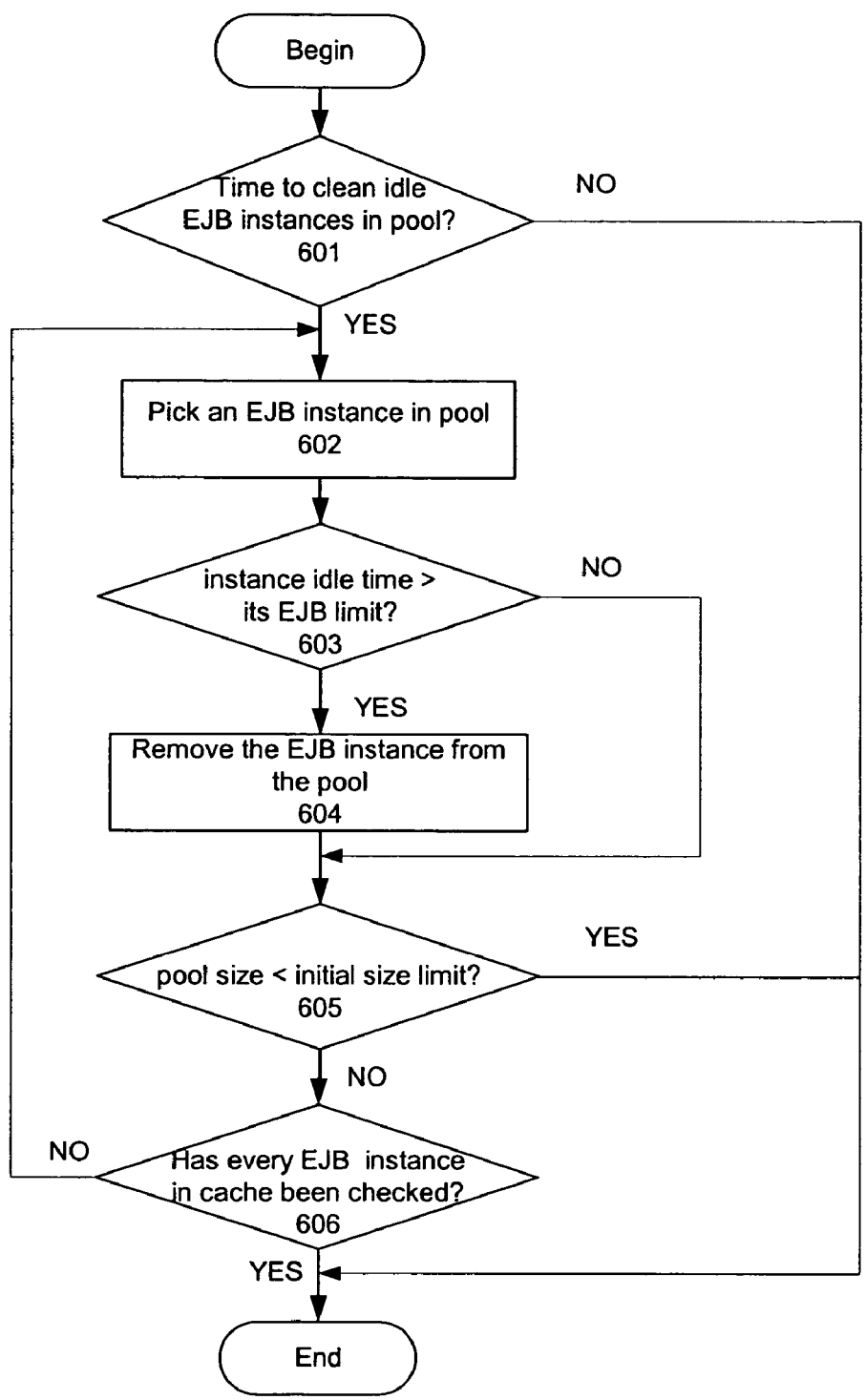
FIG. 6 is a flow chart illustrating an exemplary process of dynamic control of pool sizes in accordance with one embodiment of the invention.

FIG. 6 is a flow chart illustrating an exemplary process of dynamic control of pool sizes in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 6, if it is time to clean up idle EJB instances in a pool to leave room for the newly added instances at step 601, an instance in the pool will be picked at step 602. Step 603 checks if the idle time of the EJB instance is greater than the specified "idle-timeout-seconds" of its type. If so, the EJB instance will be removed from the pool at step 604. Steps 602-604 are repeated for every EJB instance in the pool until either the pool size has been reduced to be within the "initial-beans-in-free-pool" at step 605 or every EJB instance in the pool has been checked at step 606.

In some embodiments, the process of cleaning up idle EJB instances in a pool can control the off-peak memory usage by allowing one to specify how long the pool will allow an EJB instance to remain unused before removing it from the pool and making it eligible for garbage collection. The idle time of an EJB instance is a measurement of how long it has been since the instance was last placed into the pool. "Idle-timeout-seconds" property in the deployment descriptor refers to the amount of idle time that an instance of an EJB type will be allowed to accumulate before being eligible for removal from the pool due to its inactivity. The "idle-timeout-seconds" can cause the pool to shrink from its current size down to a floor size of "initial-beans-in-free-pool" by removing instances that have remained in the pool for longer than "idle-timeout-seconds". A daemon can periodically remove these expired instances from the pool thus freeing up heap space for others to use. Similar to dynamic cache sizing, an LRU algorithm can also be deployed.

In some embodiments, when a pool has an associated "idle-timeout-seconds" property value greater than zero, those instances that have been idle for that amount of time are eligible for removal from the pool. If a pool has no "idletimeout-seconds" property value specified or if that value is specified as zero, then the dynamic pool sizing process is not active for that pool and there will be no periodic removal of idle instances from the pool.

In some embodiments, the deployment descriptor or other suitable configuration mechanism may set properties of an EJB pool using a XML schema instance file. A tag "idle-timeout-seconds" 702 will be added under the "pool" tag 701 in the deployment descriptor, as shown by the source code in FIG. 7.

Figure 8:
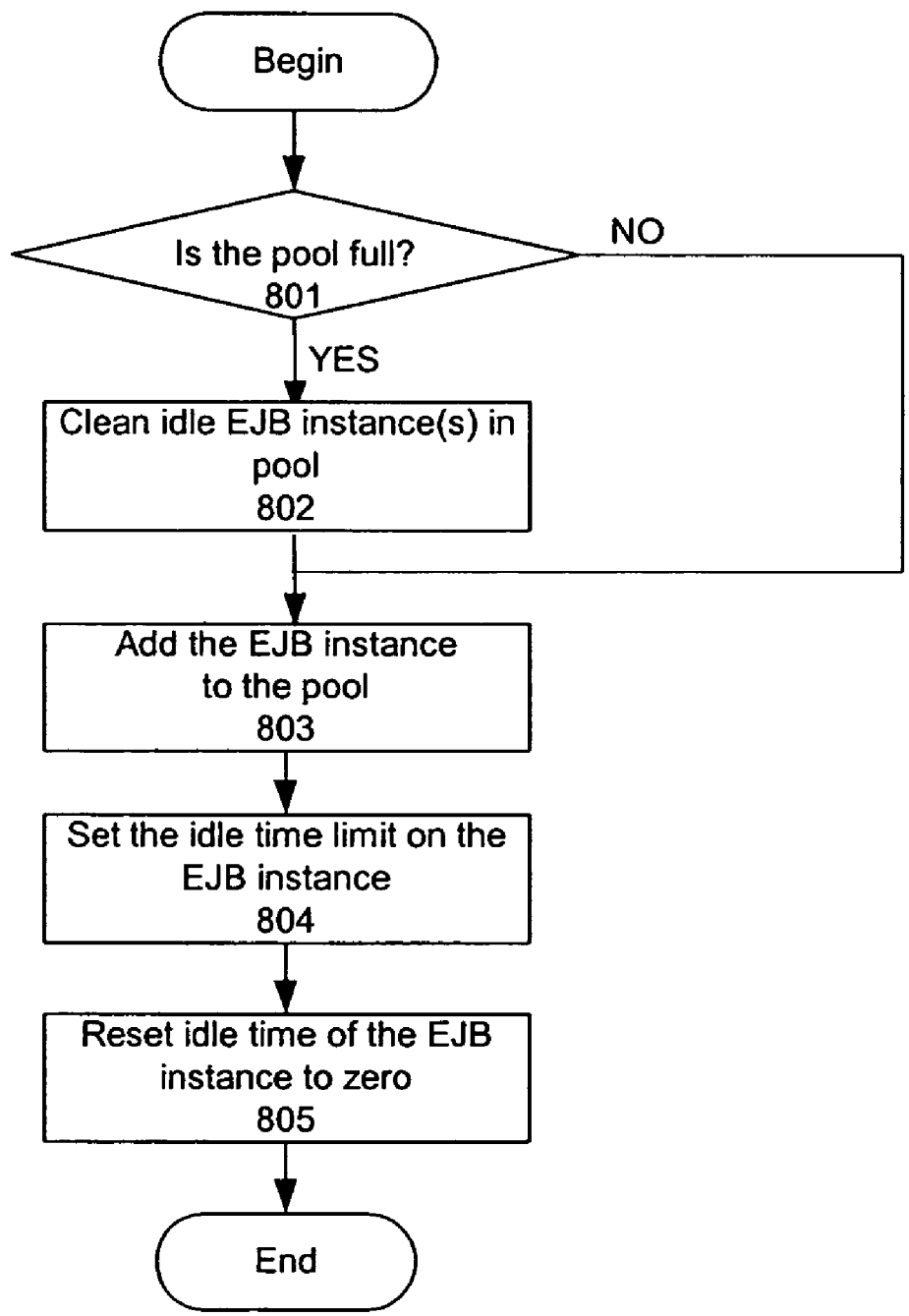
FIG. 8 is a flow chart illustrating an exemplary process of adding an EJB instance into a pool in accordance with one embodiment of the invention.

FIG. 8 is a flow chart illustrating an exemplary process of inserting an EJB instance into a pool in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 8, step 801 checks the pool for any available space to store an EJB instance. If the pool is not full, the EJB instance will be added to the cache at step 803. Otherwise, idle EJB instance(s) will be picked and removed from the pool at step 802 before the current instance can be added to the pool. Step 804 sets a limit on the maximum idle time allowed for the type of newly inserted EJB instance and step 805 will reset the idle time of the EJB instance in the pool to zero.

Figure 9:
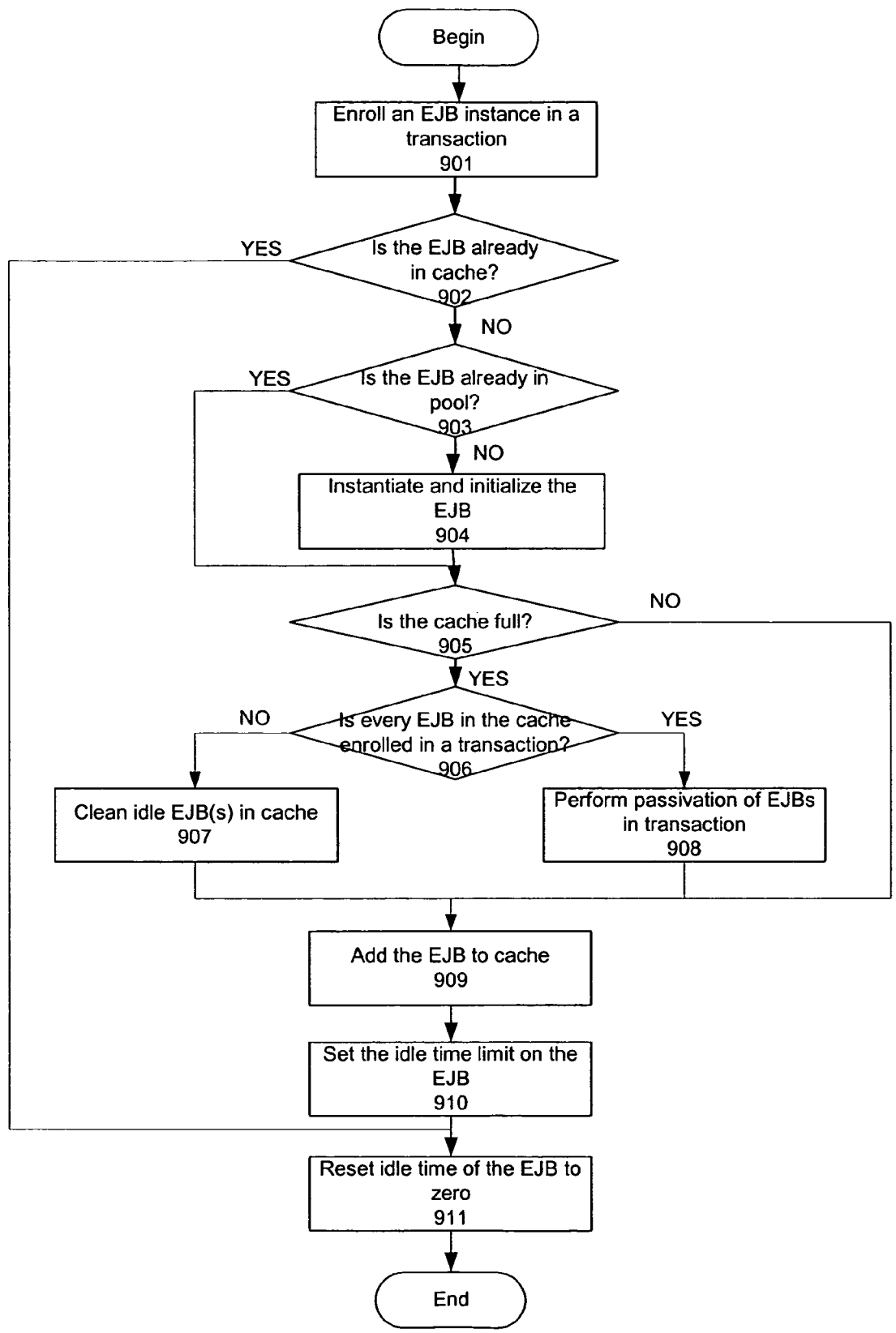
FIG. 9 is a flow chart illustrating an exemplary process of adding a new EJB instance into a cache in accordance with one embodiment of the invention.

FIG. 9 is a flow chart illustrating the exemplary process of adding an EJB instance into a cache in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 9, an EJB instance is enrolled in a business transaction at step 901. If it is determined that the EJB instance is already in cache at step 902, the idle time of the EJB instance will be reset to zero at step 911. Otherwise, step 903 checks if the EJB instance has been stored in a pool. If not, the EJB instance will be instantiated and initialized at step 904. At step 905, the cache is checked for any available space to store the EJB instance. If the cache is not full, the EJB instance will be added to the cache at step 909 and a limit on its idle time will be set at step 910. Otherwise, a cleaning up of the cache is in order. Step 906 will check if every EJB instance in the cache is currently enrolled in a business transaction. If not, the cache idle EJB instance(s) will be removed at step 907 to leave room for the new instance; otherwise, it is necessary to passivate EJB instances in the cache at step 908.

In some embodiments, when an attempt is made to insert a new EJB instance into a cache that has been filled to its maximum capacity and there are no idle bean instances in the cache, e.g., if all instances in the cache are enrolled in transactions, then the insert request of the new EJB instance may fail with a CacheFullException and the application code that depended on the successful insertion must abort. Therefore, it is necessary to passivate some of the EJB instances in the cache in order to free up space to insert the new instance, as in step 908 above. The purpose of passivation is to raise the load threshold that the EJB cache can sustain before surfacing a CacheFullException. This is achieved by passivating (remove from the cache) EJB instances in the cache that are enrolled in transactions but have met certain criteria (discussed below) and can be removed from the cache safely without causing the malfunctioning of the transactions they are enrolled in. Passivation of an EJB instance enrolled in a transaction, hereafter referred to as "passivation", will occur without any action or knowledge required on the part of the user, who can be, but is not limited to, an application developer or system administrator. It extends the usability of a cache of a given size by loosening the requirement that all instances enrolled in active transactions must be present in the cache. If the passivation fails to remove any instances from the cache, then a CacheFullException will be thrown. Passivation can proceed in stages, where the instance seeking to be put into the full cache is referred to as the "current instance" and the business transaction it is enrolled in is referred to as the "current transaction".

Figure 10:
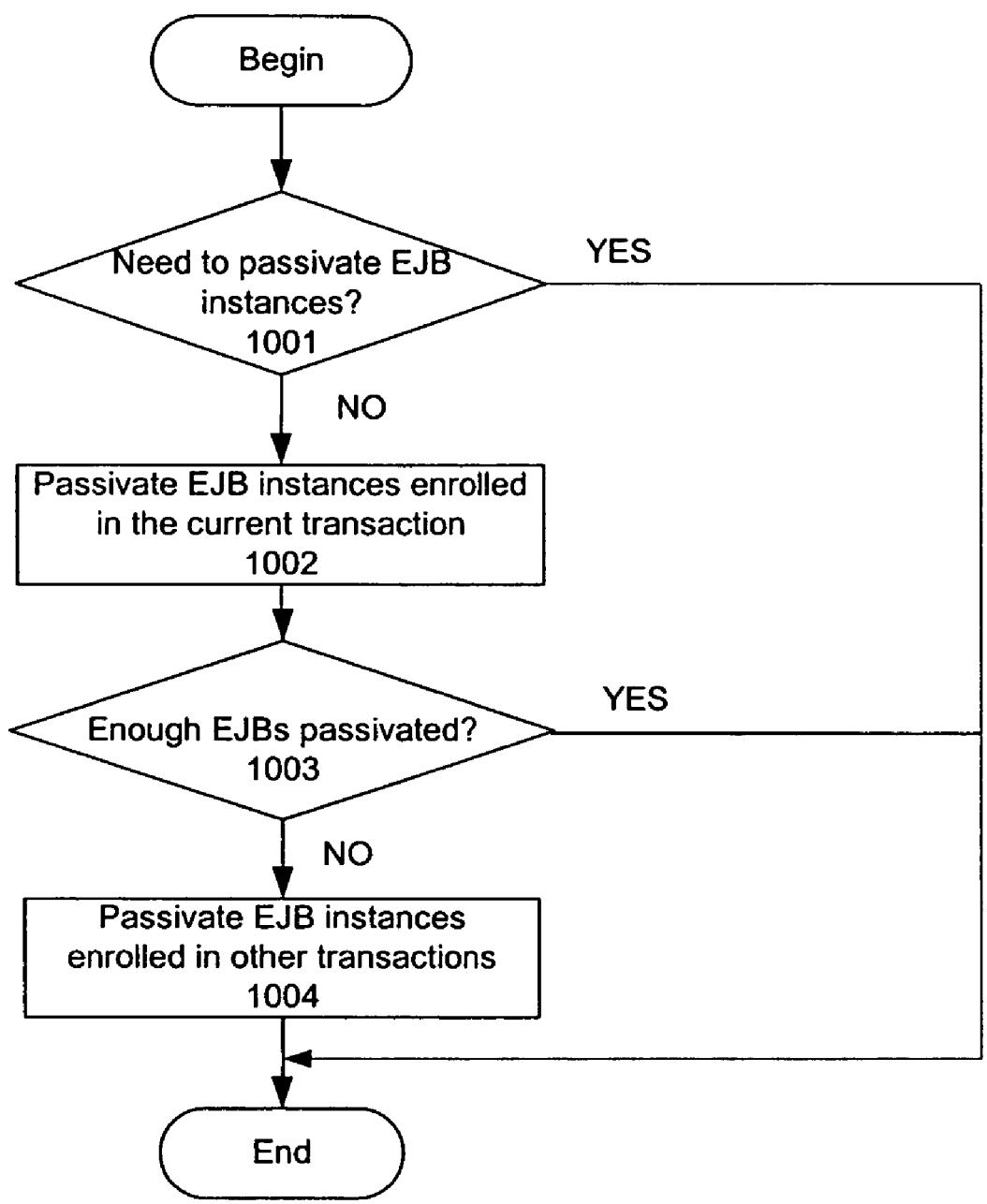
FIG. 10 is a flow chart illustrating an exemplary process of passivating EJB instances in a cache in accordance with one embodiment of the invention.

FIG. 10 is a flow chart illustrating an exemplary process of passivating EJB instances in a cache in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 10, if the cache is currently full and it is necessary to passivate EJB instances to leave room to insert a new instance enrolled by the current transaction at step 1001, EJB instances in the cache enrolled in the current transaction will be passivated first at step 1002. Step 1003 checks if enough number instances have been passivated to leave room to insert the new instance. If not, EJB instances currently enrolled in other transactions will be passivated at step 1004.

In some embodiments, the passivation process runs with a goal to passivate from a minimum number (e.g., 5) up to a maximum number (e.g., MAX (10 or 1% of "max-beans-in-cache")) of EJB instances once the passivation process starts. The goal of the passivation is to free up a small buffer, if possible, to allow not only the current EJB instances to be inserted, but also the next few cache insertion requests to be executed without the need to run passivation again. No attempt is made to passivate all eligible instances. If the passivation process frees up all eligible instances, this could hurt performance as a percentage of the passivated instances may have to be re-read from the underlying database and reinserted into the cache if an application were not finished with its operations on a given instance.

In some embodiments, an optional indication, such as a per-EJB instance method can provide application codes influence over runtime cache passivation behavior by marking instances as preferred candidates for passivation. It allows an application developer who desires to streamline cache performance to provide a hint to the cache programmatically indicating that all operations on that instance are complete for the duration of the current transaction enrolling the instance. The cache will make use of this hint when evaluating EJB instances for passivation. When an instance in such a condition is passivated, then for the remaining duration of the transaction there are likely no performance-related penalties to be paid as a result of having to re-read the data from the database or from having to put the reconstituted instance back into the cache.

In some embodiments, if the cache becomes full with instances enrolled in transactions and requires the passivation of instances in transactions to take place, the cache passivation process will attempt to remove instances that have been marked as complete (e.g., as indicated by a method) first. Passivation of these instances first has great potential to increase the performance of the cache, since the pulling of a passivated instance back into the cache requires a database access to re-read the passivated state of the instance. Database access is among the most costly of application server activities. By knowingly passivating first those instances that will not be required to be pulled back into the cache in the future, a potential gain in overall system performance is realized.

A container-managed persistence (CMP) EJB relies on the container to perform persistent data access on behalf of the instances of the EJB. The container transfers data between an instance and the underlying data source, such as the database, as a result of the execution of the methods of the EJB. On the contrary, a bean-managed persistence (BMP) EJB relies on its own methods to perform persistent data access on behalf of the instances of the EJB. Therefore, it is preferable to passivate instances of CMP EJBs before the instances of BMP EJBs from data persistence perspective in various embodiments.

Figure 11:
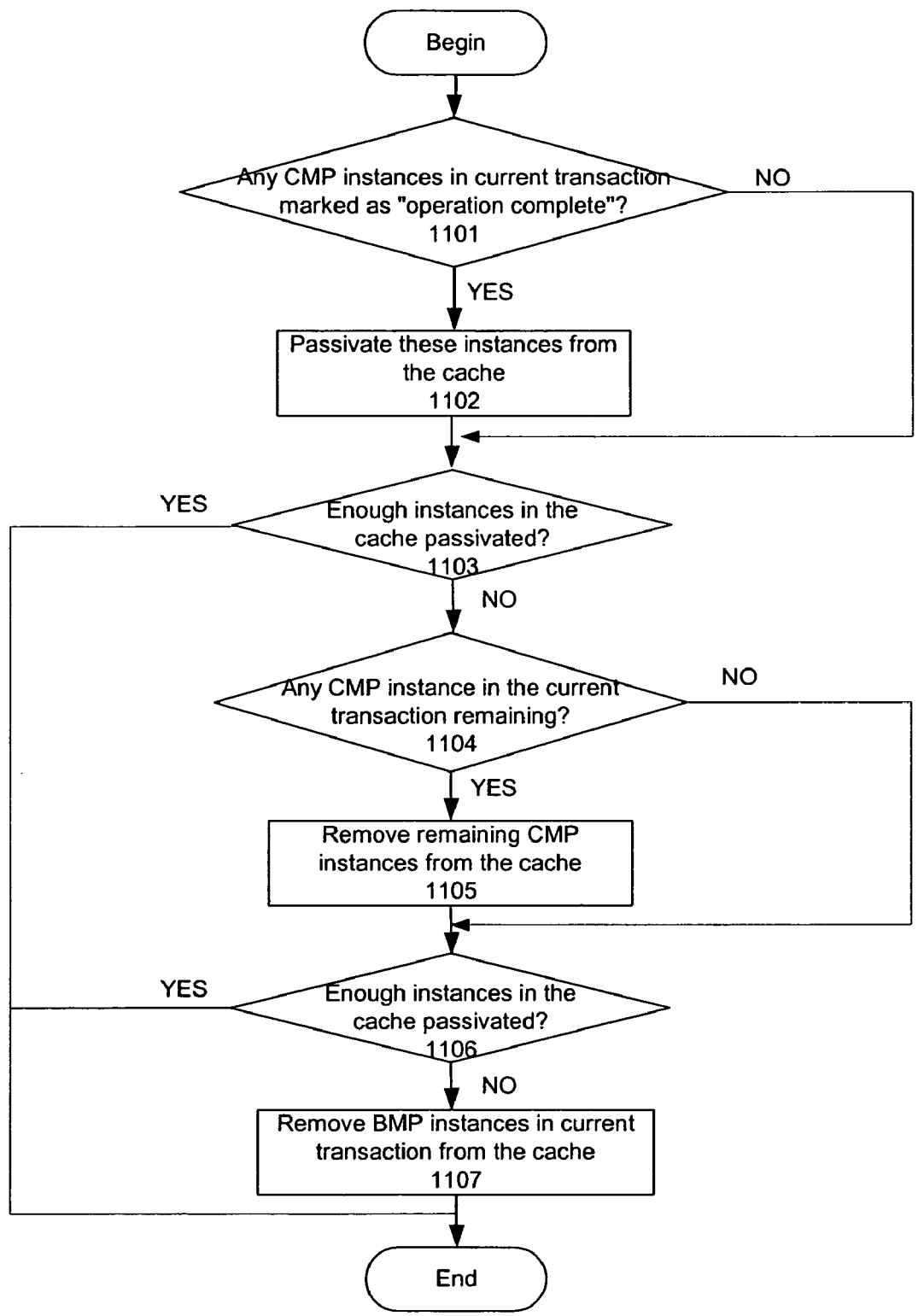
FIG. 11 is a flow chart illustrating an exemplary process of passivating EJB instances enrolled in the current transaction in accordance with one embodiment of the invention.

FIG. 11 is a flow chart illustrating the exemplary process of passivating EJB instances enrolled in the current transaction in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 11, step 1101 checks if any instances of CMP EJBs enrolled in the current transaction have been marked as complete. If so, such instances will be passivated from the cache and stored in persistence storage, if necessary, at step 1102. If there are not enough instances that have been passivated at step 1103 to insert the new instance, step 1104 will check if there are any remaining instances of CMP EJBs enrolled in the current transaction. If so, these instances will be removed from the cache at step 1105. If there are still not enough instances passivated in the cache at step 1106 to insert the new instance, instances of BMP EJBs enrolled in the current transaction will be removed at step 1107.

Figure 12:
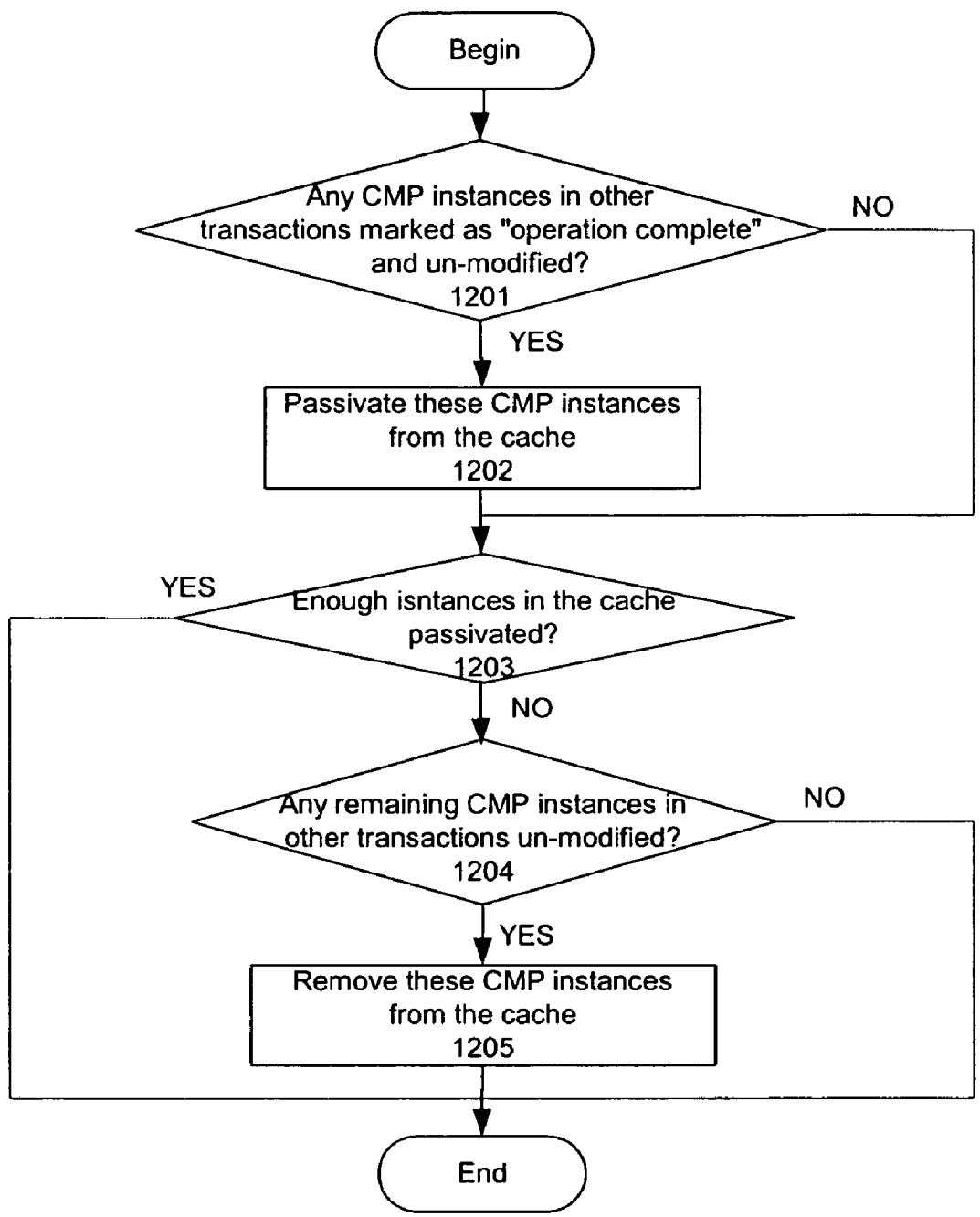
FIG. 12 is a flow chart illustrating an exemplary process of passivating EJB instances enrolled in the other transactions in accordance with one embodiment of the invention.

FIG. 12 is a flow chart illustrating the exemplary process of passivating EJB instances enrolled in other transactions in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 12, step 1201 checks if any instances of CMP EJBs enrolled in other transactions are unmodified and have been marked as complete. If so, such instances will be passivated from the cache at step 1202. If there are not enough instances passivated in the cache at step 1203 to insert the new instance, step 1204 will check if there are any remaining instances of CMP EJBs enrolled in other transactions and have not been modified. If so, these instances will be passivated from the cache at step 1205.

In some embodiments, an user interface (e.g., a console) may perform runtime monitoring of the passivation process by displaying a statistic called "passivation in transaction ratio", which is a ratio of the number of "passivation in a transaction" events to "cache access" events. In general, any non-negligible value of "passivation in transaction ratio" should be taken as an indication that the value of the cache property "max-beans-in-cache" should be increased.

In some embodiments, when an application executes a finder to retrieve EJB instances from the underlying database using query statements of one or more query languages, it is almost certainly a prelude to actually doing work on at least some of the instances that are returned by the finder. It is therefore desirable to have those instances remain in the cache for use after the finder has executed. More specifically, if during the running of a finder a cache-full condition is encountered, then the passivation process will run but it will not remove any instances that were previously placed in the cache by that finder. If the passivation process is unable to free up enough cache space to accommodate all the instances returned by the finder, then the finder will return so-called "placeholders", which are instances that the cache does not currently have space for. After the finder execution has completed, any instances in the cache that were placed there on behalf of the finder are eligible for passivation.

Figure 13:
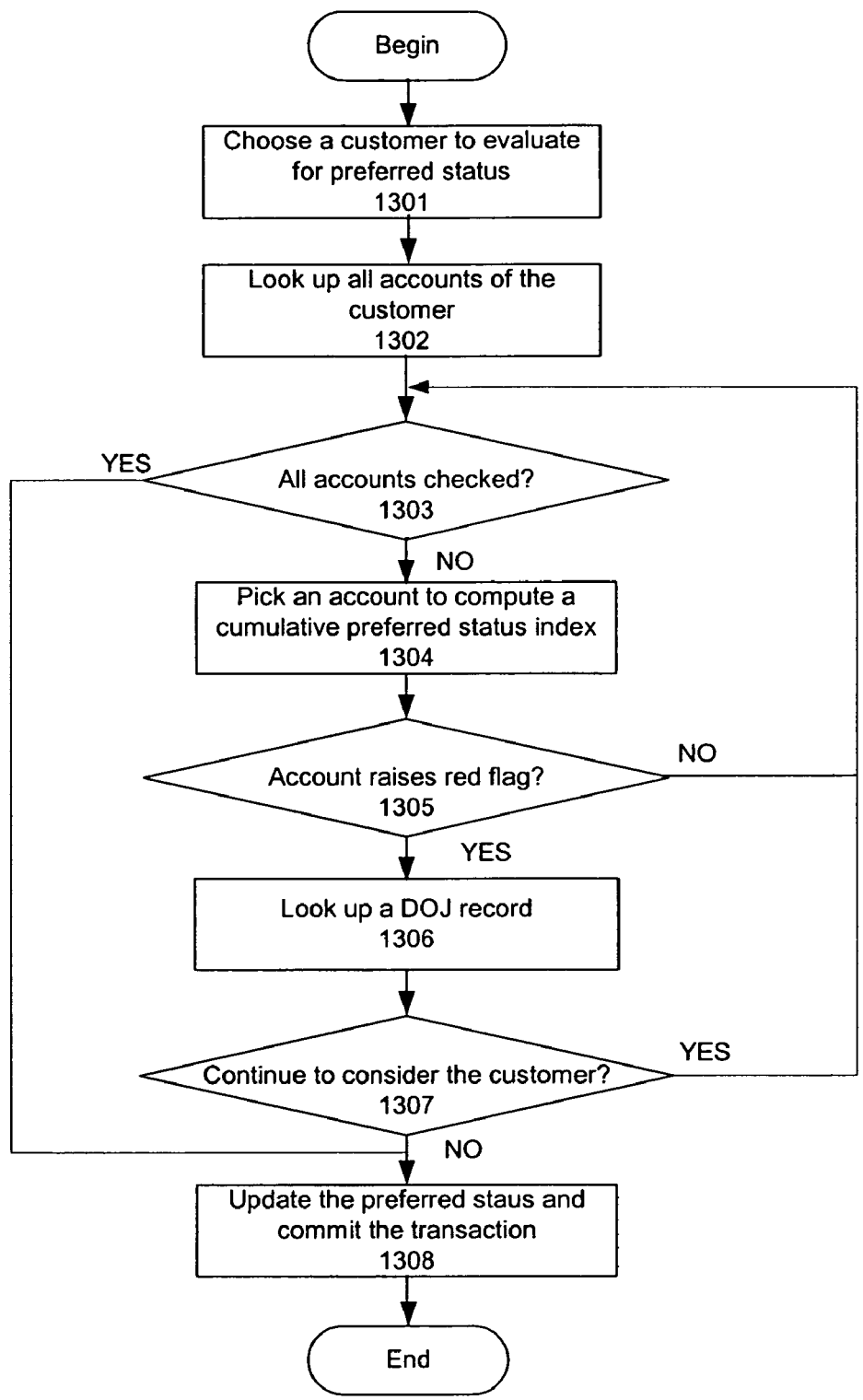
FIG. 13 is a flow chart illustrating an exemplary process of passivating EJB instances enrolled in transactions in accordance with one embodiment of the invention.

FIG. 13 is a flow chart illustrating an exemplary process of passivating EJB instances enrolled in transactions in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 13, an exemplary business operation "assign preferred status" is executed in a hypothetical application to illustrate the usage of the passivation of EJB instances in transaction. This application has customers and accounts in a one-to-many relationship, e.g., a customer may have multiple accounts. Occasionally, special trial offers are made to preferred customers based on their account activities. A customer "C" is chosen for evaluation of eligibility for preferred status at step 1301. Step 1302 looks up the collection of the accounts associated with C. If all accounts of the customer C have been checked at step 1303, the preferred status of C is updated and the transaction is committed at step 1308. Otherwise, an account of C will be chosen, whose information will be used to compute the cumulative "preferred status index" of C at step 1304. If the data of the account raises a red flag at step 1305, an EJB instance is looked up that encapsulates data from a record (which may or may not exist) at the Department of Justice at step 1306. If the information from the DOJ determines the customer should continue to be considered for the "preferred" status at step 1307, the process will proceed to process other accounts of C. Otherwise, the transaction will terminate.

In some embodiments, a "findByPrimaryKey" finder is executed to return an instance of CustomerBean type at step 1301, with relationship caching on instances of AccountBean type at step 1302. Here, relationship caching allows a finder querying instances of a particular type to also pull in related instances and caches them. These related bean instances are not specified in the SELECT clause of the finder query. The execution of this finder places instance C of CustomerBean type and all the related AccountBean instances of C into the cache.

In some embodiments, the "operationsComplete( )" method is invoked on the AccountBean instance when the application is finished using the data from the current AccountBean instance to compute the cumulative "preferred status index" at step 1304. This provides a hint to the cache that the AccountBean instance is no longer of any interest to the application.

In some embodiments, an AccountBean instance with some information causes some concern at step 1305, and the Department of Justice must be queried for some information about the customer holding the account. A finder is invoked to pull in the relevant DOJ record as a DOJRecordBean instance, assuming that this customer has a record on file. It turns out that at this time, the cache may be completely full of instances that are enrolled in transactions. In order to continue with the operation, some instances in the cache must be passivated to make room to insert the DOJRecordBean instance. Here, the passivation process can come into play: the AccountBean instances that had previously been marked as "operationsComplete" are passivated first. Such passivation would likely free up a little more space before stopping. Cache passivation next seeks out any storable CMP EJB instances enrolled in the current transaction that are still in the cache. After finding and passivating one additional instance, the passivation process has met its quota and stops. The DOJRecordBean instance is inserted into the cache. If the application finds nothing in the DOJ record that would prevent the granting of preferred status to C, it continues on with the remaining AccountBean instances. Otherwise, customer C will be rejected for preferred status and no more accounts will be examined further.

Once the current transaction commits at step 1308, the instances of CustomerBean, AccountBeans and DOJRecordBean may remain in the cache but un-enrolled in any transaction. If another thread needs more space in the cache, those instances that are no longer in use will be candidates for removal from the cache using, for example, the clean-up process of idle EJB instances.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "instance" is used in the embodiments of the systems and methods described above, it will be evident that such concept can be interchangeably used with equivalent concepts such as, object, and other suitable concepts. While the concept "transaction" is used in the embodiments of the systems and methods described above, it will be evident that such concept can be interchangeably used with equivalent concepts such as, conversation, session, and other suitable concepts. While the concept "type" is used in the embodiments of the systems and methods described above, it will be evident that such concept can be interchangeably used with equivalent concepts such as, class, interface, bean, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to support cache initialization on demand, comprising:
   a container, associated with a transaction, to hold objects of one or more classes defined by an object-oriented programming language, wherein the container is a part of an application server;
   a cache, within the container, to store in a first memory a first one or more objects of the one or more classes, wherein the first one or more objects stored in the cache can be at least one of enrolled in the transaction and idle;
   a pool, within the container, to store in a second memory a second one or more objects of the one or more classes wherein the second one or more objects stored in the pool are initiated and idle with a readiness level lower than the first one or more objects stored in the cache;
   an on-demand initialization process associated with a console for triggering the initialization of the cache of the class; and
   wherein the container operates to:
   initialize the cache on demand at runtime before a class in the one or more classes is deployed, by removing one or more idle objects of the class from the cache to the pool; and
      add at least one said object to the cache, if the at least one said object is already in the pool but not in the cache, when the at least one said object of the one or more classes is enrolled in the transaction.

2. The system according to claim 1, wherein:
   the class is one of an interface, a module, and a software object.

3. The system according to claim 1, wherein:
   the container is further capable of initializing the cache without shutting down and/or starting up an application server running the cache.

4. The system according to claim 1, wherein:
   the container is further capable of performing at least one of:
      setting idle time of the at least one said object to zero; and
      monitoring the at least one said object.

5. The system according to claim 1, further comprising:
   a garbage collector to receive, from the pool, one or more idle objects.

6. The system according to claim 1, wherein:
   the container contains a batch scheduler to remove idled objects in batches and set a limit on processing time of each batch based on a feedback from a previous batch.

7. The system according to claim 1, wherein:
   the cache and the pool is dedicated to caching objects of a specific type of class.

8. The system according to claim 1, wherein:
   only the first one or more objects stored in the cache are ready to be enrolled in a transaction.

9. The system according to claim 1, wherein:
the container can further passivate at least one existing object of the first one or more objects stored in the cache in order to free up space to insert a new object in the cache, when all of the first one or more objects are enrolled in a transaction, wherein the at least one existing object is removed from the cache when a per-instance application code method marks the at least one existing object as a preferred candidate for passivation.

10. The system according to claim 1, wherein:
the container uses a cache control component to remove one or more idle objects of the class from the cache to the pool.

11. The system according to claim 1, wherein:
the container uses a pool control component to remove one or more idle objects of the class from the pool when one or more criteria are met.

12. The system according to claim 1, wherein:
the container operates to initiate the at least one said object if the at least one said object is not already in the cache and the pool, when at least one said object of the one or more classes is enrolled in the transaction.

13. A method to support cache initialization on demand, comprising:
holding objects of one or more classes defined by an object-oriented programming language in a container, wherein the container is associated with a transaction and is a part of an application server;
storing in a first memory a first one or more objects of the one or more classes via a cache in the container, wherein the first one or more objects stored in the cache can be at least one of enrolled in the transaction and idle;
storing in a second memory a second one or more objects of the one or more classes via a pool in the container, wherein the second one or more objects stored in the pool are initiated and idle with a readiness level lower than the first one or more objects stored in the cache;
triggering the initialization process, wherein the on-demand initialization process is associated with a console;
initializing, via the container, the cache on demand at runtime before a class in the one or more classes is deployed, by removing one or more idle objects of the class from the cache to the pool; and
adding, via the container, at least one said object to the cache, if the at least one said object is already in the pool but not in the cache, when the at least one said object of the one or more classes is enrolled in the transaction.

14. The method according to claim 13, further comprising:
initializing the cache without shutting down and/or starting up an application server running the cache.

15. The method according to claim 13, further comprising:
performing at least one of:
setting idle time of the at least one said object to zero; and
monitoring the at least one said object.

16. A machine readable storage medium having instructions stored thereon that when executed by a processor cause a system to:
hold objects of one or more classes defined by an object-oriented programming language in a container, wherein the container is associated with a transaction and is a part of an application server;
store a first memory a first one or more objects of the one or more classes via a cache in the container, wherein the first one or more objects stored in the cache can be at least one of enrolled in the transaction and idle;
store in a second memory a second one or more objects of the one or more classes via a pool in the container, wherein the second one or more objects stored in the pool are initiated and idle with a readiness level lower than the first one or more objects stored in the cache;
trigger the initialization of the cache of the class via an on-demand initialization process, wherein the on-demand initialization process is associated with a console;
initialize, via the container, the cache on demand at runtime before a class in the one or more classes is deployed, by removing one or more idle objects of the class from the cache to the pool; and
add, via the container, at least one said object to the cache, if the at least one said object is already in the pool but not in the cache, when the at least one said object of the one or more classes is enrolled in the transaction.

17. The machine readable medium of claim 16, further comprising instructions that when executed cause the system to:
initialize the cache without shutting down and/or starting up an application server running the cache.

18. The machine readable medium of claim 16, further comprising instructions that when executed cause the system to:
perform at least one of:
setting idle time of the at least one said object to zero; and
monitoring the at least one said object.

19. A system to support cache initialization on demand, comprising:
means for holding objects of one or more classes defined by an object-oriented programming language in a container, wherein the container is associated with a transaction and is a part of an application server;
means for storing in a first memory a first one or more objects of the one or more classes via a cache in the container, wherein the first one or more objects stored in the cache can be at least one of enrolled in the transaction and idle;
means for storing in a second memory a second one or more objects of the one or more classes via a pool in the container, wherein the second one or more objects stored in the pool are initiated and idle with a readiness level lower than the first one or more objects stored in the cache;
means for triggering the initialization of the cache of the class via an on-demand initialization process, wherein the on-demand initialization process is associated with a console;
means for initializing via the container, the cache on demand at runtime before a class in the one or more classes is deployed, by removing one or more idle objects of the class from the cache to the pool; and
means for adding, via the container, at least one said object to the cache, if the at least one said object is already in the pool but not in the cache, when the at least one said object of the one or more classes is enrolled in the transaction.

* * * * *